US00RE41250E

(19) United States
(12) Reissued Patent
Henneberger

(10) Patent Number: US RE41,250 E
(45) Date of Reissued Patent: Apr. 20, 2010

(54) TELECOMMUNICATIONS CONNECTOR WITH SPRING ASSEMBLY AND METHOD FOR ASSEMBLING

(75) Inventor: Roy L. Henneberger, Apple Valley, MN (US)

(73) Assignee: ADC Telecommunications, Inc., Eden Prairie, MN (US)

(21) Appl. No.: 11/119,492

(22) Filed: Apr. 28, 2005

Related U.S. Patent Documents

Reissue of:
(64) Patent No.: 6,554,653
Issued: Apr. 29, 2003
Appl. No.: 09/811,148
Filed: Mar. 16, 2001

(51) Int. Cl.
*H01R 24/00* (2006.01)

(52) U.S. Cl. ..... 439/676; 439/76.1; 439/941
(58) Field of Classification Search ..... 439/676, 439/76.1, 941, 541.5, 752.5
See application file for complete search history.

(56) References Cited

U.S. PATENT DOCUMENTS

| | | | |
|---|---|---|---|
| 4,274,691 | A | 6/1981 | Abernethy et al. |
| 4,406,509 | A | 9/1983 | Jagen |
| 4,457,570 | A | 7/1984 | Bogese, II |
| 4,556,264 | A | 12/1985 | Tanaka |
| 4,602,842 | A | 7/1986 | Free et al. |
| 4,641,901 | A | 2/1987 | Brennan et al. |
| 4,703,991 | A | 11/1987 | Philippson |
| 4,790,769 | A | 12/1988 | Kanada |
| 4,820,192 | A | 4/1989 | Denkmann et al. |
| 5,096,442 | A | 3/1992 | Arnett et al. |
| 5,118,310 | A | 6/1992 | Stroede et al. |
| 5,123,854 | A | 6/1992 | Petersen et al. |
| 5,169,346 | A | 12/1992 | Johnston |
| 5,186,647 | A | 2/1993 | Denkmann et al. |

(Continued)

FOREIGN PATENT DOCUMENTS

| | | |
|---|---|---|
| EP | 0 952 640 A1 | 10/1999 |
| GB | 2 273 397 | 1/1997 |

OTHER PUBLICATIONS

"Ex.4: Commscope's Preliminary Responsive Claim Chart to U.S. Pat. No. 6,544,653," *ADC Telecommunications, Inc. v. CommScope Solutions Properties, LLC and CommScope Solutions, Inc.*, District of Minnesota, Civil Action No. 05–02584 ADM–JSM, pp. 1–10 (Jul. 18, 2006).

(Continued)

*Primary Examiner*—Truc T Nguyen
(74) *Attorney, Agent, or Firm*—Merchant & Gould P.C.

(57) ABSTRACT

An electrical connector including a spring mounting body having a clip receiving structure. A plurality of contact springs are mounted on the spring mounting body. A clip is inserted within the clip receiving structure to stabilize the contact springs. Portions of the contact springs are captured between the clip and the spring mounting body. A method for assembling the electrical connector is also disclosed.

37 Claims, 17 Drawing Sheets

U.S. PATENT DOCUMENTS

| | | | |
|---|---|---|---|
| 5,308,260 | A | 5/1994 | Johnston et al. |
| 5,312,273 | A | 5/1994 | Andre et al. |
| 5,346,405 | A | 9/1994 | Mosser, III et al. |
| 5,358,430 | A | 10/1994 | Bonvallat et al. |
| 5,387,135 | A | 2/1995 | Shen et al. |
| 5,419,720 | A | 5/1995 | Chen |
| 5,425,660 | A | 6/1995 | Weikle |
| 5,503,572 | A | 4/1996 | White et al. |
| 5,513,065 | A | 4/1996 | Caveney et al. |
| 5,547,405 | A | 8/1996 | Pinney et al. |
| 5,580,274 | A | 12/1996 | Tsair |
| 5,586,914 | A | 12/1996 | Foster, Jr., et al. |
| 5,624,274 | A | 4/1997 | Lin |
| 5,626,497 | A | 5/1997 | Bouchan et al. |
| 5,697,815 | A | 12/1997 | Drewnicki |
| 5,697,817 | A | 12/1997 | Bouchan et al. |
| 5,779,503 | A | 7/1998 | Tremblay et al. |
| 5,790,660 | A | 8/1998 | Vlaeminck |
| 5,791,943 | A | 8/1998 | Lo et al. |
| 5,885,111 | A | 3/1999 | Yu |
| 5,921,818 | A | 7/1999 | Larsen et al. |
| 5,924,896 | A | 7/1999 | Arnett et al. |
| 5,940,959 | A | 8/1999 | Caveney et al. |
| 5,947,761 | A | 9/1999 | Pepe |
| 5,947,772 | A | 9/1999 | Arnett et al. |
| 5,975,919 | A | 11/1999 | Arnett et al. |
| 5,975,960 | A | 11/1999 | Fogg et al. |
| 5,989,069 | A | 11/1999 | Tan |
| 5,997,358 | A | 12/1999 | Adriaenssens et al. |
| 6,012,936 | A | 1/2000 | Siemon et al. |
| 6,019,631 | A | 2/2000 | Chen |
| 6,083,052 | A | 7/2000 | Adams et al. |
| 6,086,428 | A | 7/2000 | Pharney et al. |
| 6,089,923 | A | 7/2000 | Phommachanh |
| 6,093,059 | A | 7/2000 | Bogese |
| 6,093,060 | A | 7/2000 | Wiebking et al. |
| 6,102,722 | A | 8/2000 | Arnett |
| 6,116,964 | A | 9/2000 | Goodrich et al. |
| 6,139,368 | A | 10/2000 | Bogese, II |
| 6,165,023 | A | 12/2000 | Troutman et al. |
| 6,179,667 | B1 | 1/2001 | Espenshade et al. |
| 6,200,161 | B1 * | 3/2001 | McClinton et al. ..... 439/541.5 |
| 6,305,950 | B1 | 10/2001 | Doorhy |
| 6,530,810 | B2 * | 3/2003 | Goodrich et al. ..... 439/676 |
| 6,579,128 | B1 * | 6/2003 | Wu ..... 439/676 |
| 6,629,862 | B2 * | 10/2003 | Schmidt et al. ..... 439/676 |
| 6,641,443 | B1 * | 11/2003 | Itano et al. ..... 439/676 |
| 6,869,318 | B2 * | 3/2005 | Viklund et al. ..... 439/676 |

OTHER PUBLICATIONS

Exhibit A: "Complaint," *ADC Telecommunications, Inc.* v. *CommScope Solutions Properties, LLC and CommScope Solutions, Inc.,* District of Minnesota, Civil Action No. 0:05–cv–02584 ADM–JSM, pp. 1–10 (Nov. 7, 2005).

Exhibit B: "Answer and Counterclaims," *ADC Telecommunications, Inc.* v. *CommScope Solutions Properties, LLC and CommScope Solutions, Inc.,* District of Minnesota, Civil Action No. 0:05–cv–02584 ADM–JSM, pp. 1–16 (Dec. 29, 2005).

Exhibit C: "ADC's Reply and Counterclaims to Defendants 'Counterclaims, " *ADC Telecommunications, Inc* .v. *CommScope Solutions Properties, LLC and CommScope Solutions, Inc.* , District of Minnesota, Civil Action No. 0:05–cv–02584 ADM–JSM, pp. 1–10 (Feb. 17, 2006).

Exhibit D: "First Amended Complaint," *ADC Telecommunications, Inc. and ADC GmbH*v. *CommScope Solutions Properties, LLC and CommScope Solutions, Inc.*, District of Minnesota, Civil Action No. 0:05–cv–02584 ADM–JSM, pp. 1–12 (Apr. 19, 2006).

Exhibit E: "Answer and Counterclaims to First Amemded Complaint," *ADC Telecommunications, Inc. and ADC GmbH* v. *CommScope Solutions Properties, LLC and CommScope Solutions, Inc.*, District of Minnesota, Civil Action No. 0:05–cv–02584 ADM–JSM, pp. 1–17 (Apr. 28, 2006).

* cited by examiner

TELECOMMUNICATIONS CONNECTOR WITH SPRING ASSEMBLY AND METHOD FOR ASSEMBLING

Matter enclosed in heavy brackets [ ] appears in the original patent but forms no part of this reissue specification; matter printed in italics indicates the additions made by reissue.

FIELD OF THE INVENTION

The present invention relates generally to telecommunications connectors and to methods for assembling telecommunications connectors.

BACKGROUND OF THE INVENTION

Modular connectors such as modular plugs and modular jacks are commonly used in the telecommunications industry. FIG. 1 illustrates an exemplary modular connector 20 (e.g., an RJ45 connector). The connector 20 includes eight spring contacts numbered from one to eight. The eight contacts form four separate circuits or pairs for conveying twisted pair (e.g., tip and ring) signals. FIG. 1 shows a conventional pairing configuration in which springs 4 and 5 form a first circuit, springs 3 and 6 form a second circuit, springs 1 and 2 form a third circuit, and springs 7 and 8 form a fourth circuit.

Crosstalk can be a significant source of interference in telecommunications systems. Crosstalk is typically caused by the unintentional transfer of energy from one signal pair to another. Commonly, the transfer of energy is caused by inductive or capacitive coupling between the conductors of different circuits. Crosstalk is particularly problematic in modular connectors because of the close spacing of the contact springs. The most severe crosstalk frequently occurs between the two inside circuits of a modular connector (i.e., the circuits formed by contact springs 4, 5 and 3, 6).

To reduce crosstalk, a variety of different spring configurations have been developed. Often, the spring shapes are quite complicated and the springs can be difficult to assemble and maintain in the desired orientations suitable for reducing crosstalk. What is needed is an improved method for assembling contact springs in a telecommunications connector.

SUMMARY OF THE INVENTION

One aspect of the present invention relates to an electrical connector including a spring mounting body having a clip receiving structure. A plurality of contact springs are mounted on the spring mounting body. A clip is inserted within the clip receiving structure to stabilize the contact springs. Portions of the contact springs are captured between the clip and the spring mounting body.

A method for mounting telecommunication connector springs including providing a dielectric spring mounting body, and positioning a plurality of contact springs at desired locations on the spring mounting body. The method also includes stabilizing the contact springs by capturing portions of the contact springs between the spring mounting body and a dielectric clip. The method further includes connecting the clip to the spring mounting body with the captured portions of the contact springs remaining captured after the clip has been connected to the spring mounting body.

A variety of advantages of the invention will be set forth in part in the description that follows, and in part will be apparent from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several aspects of the invention and together with the description, serve to explain the principles of the invention. A brief description of the drawings is as follows.

DETAILED DESCRIPTION

Reference will now be made in detail to exemplary aspects of the present invention that are illustrated in the accompanying drawings. Wherever possible, the same reference numbers will be used throughout the drawings to refer to the same or like parts.

Figure 2A:
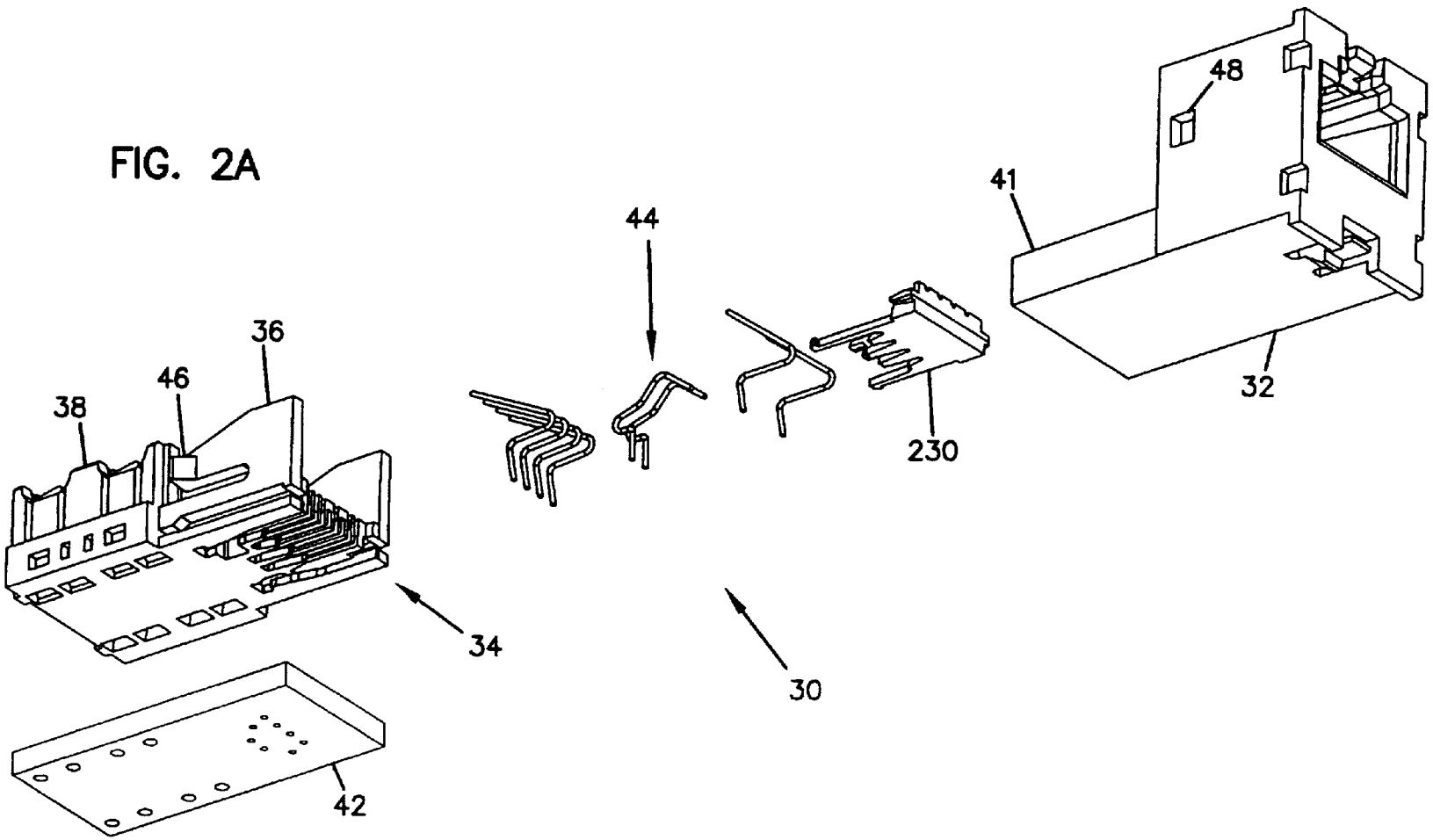
FIG. 2A is an exploded, front perspective view of a modular jack constructed in accordance with the principles of the present invention.
Figure 2B:
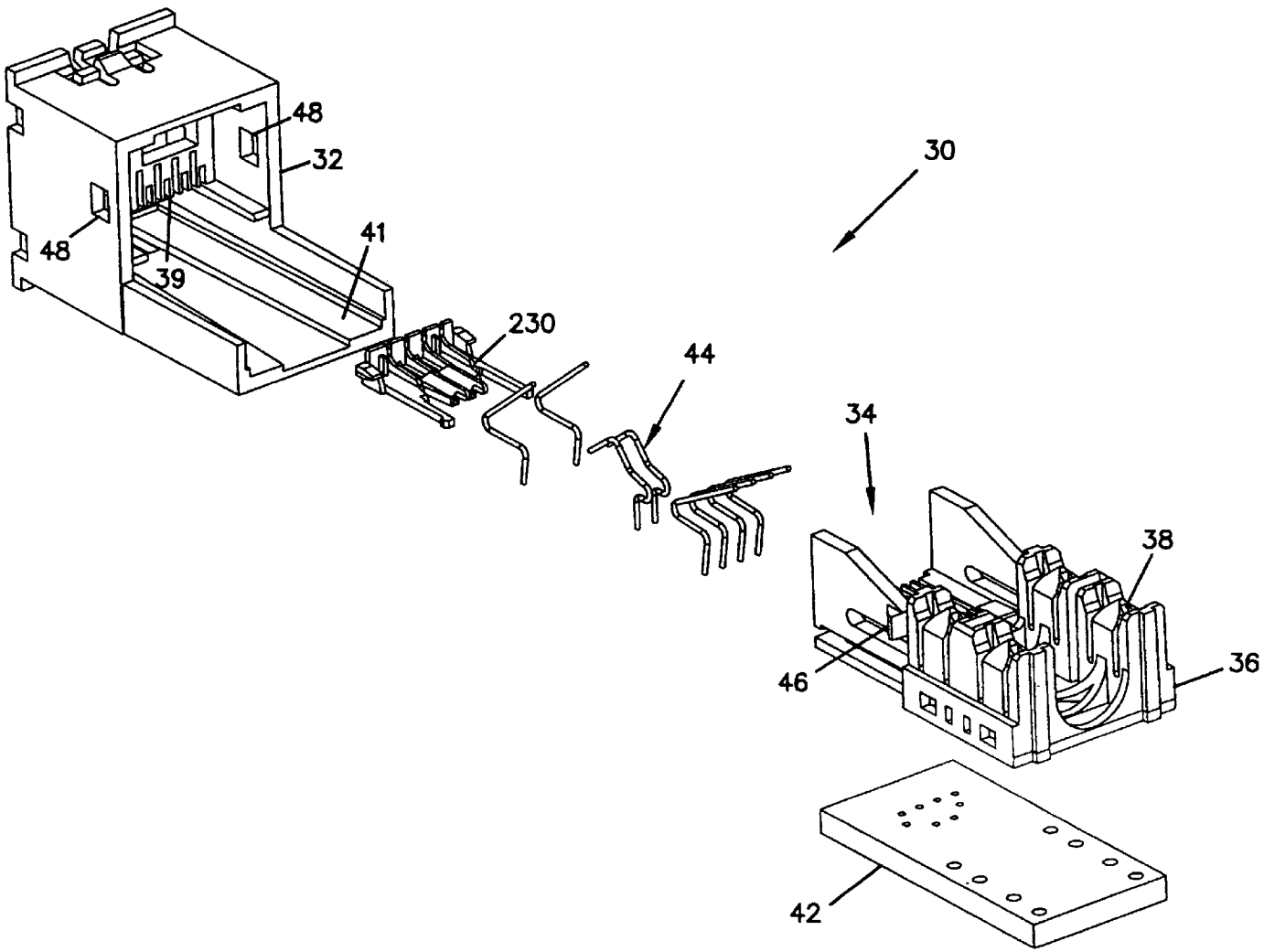
FIG. 2B is an exploded, rear perspective view of the modular jack of FIG. 2A.

FIGS. 2A and 2B illustrate a modular jack 30 constructed in accordance with the principles of the present invention. The modular jack 30 includes a housing 32 and an insert assembly 34 adapted to snap fit within the housing 32. The insert assembly 34 includes an insert body 36, a circuit board 42, a spring retaining clip 230 and a plurality of contact springs 44 (e.g., eight contact springs). insulation displacement connectors 38 are provided on a top side of the insert body 36. The springs 44 are secured to the insert body 36 by the retaining clip 230. When assembled, the circuit board 42 mounts to a bottom side of the insert body 36, and the contact springs 44 extend above the top side of the insert body 36. Tracings (not shown) on the circuit board 42 provide electrical connections between the contact springs 44 and respective ones of the insulation displacement connectors 38. Details relating to a circuit board tracing configuration suitable for use with the present invention are disclosed in U.S. Pat. No. 6,089,923 issued Jul. 18, 2000, which is hereby incorporated by reference.

To mount the insert assembly 34 in the housing 32, the insert assembly 34 is placed in a channel 41 of the housing 32. The insert assembly 34 is then slid toward the front of the housing 32 until resilient locking tabs 46 of the insert body 36 snap fit within corresponding openings 48 defined by the housing 32. When the insert assembly 34 is snap fit within the housing 32, the springs 44 of the insert assembly 34 are separated by a divider 39 positioned within the housing 32.

Figure 3:
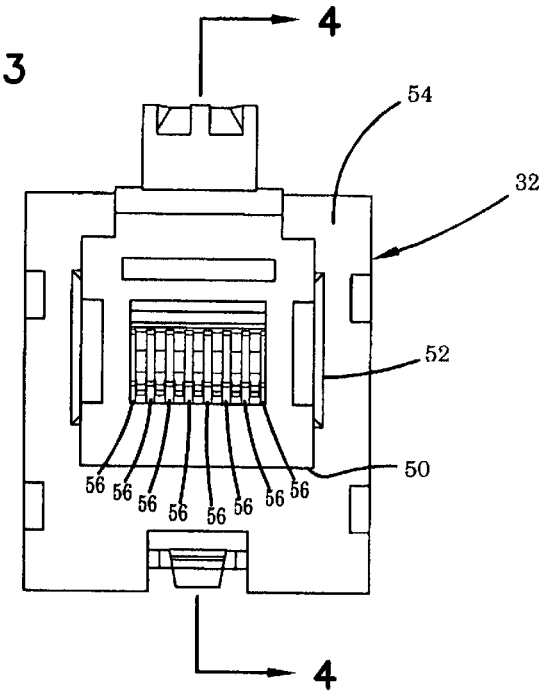
FIG. 3 is a front view of the jack of FIG. 2 with a modular plug inserted therein.
Figure 4:
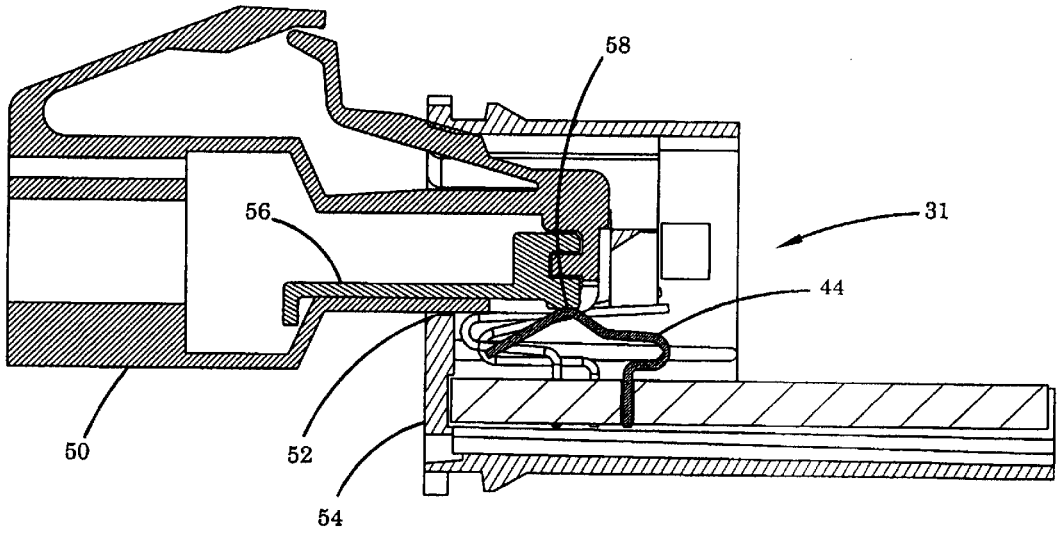
FIG. 4 is a cross-sectional view taken along section line 4—4 of FIG. 3.

FIG. 3 shows a modular plug 50 inserted within a port 52 defined by a front side 54 of the housing 32. The plug 50 includes eight contacts 56 that provide electrical connections with the contact springs 44 of the modular jack 30 when the plug 50 is inserted within the port 52. For example, FIG. 4 shows one of the contacts 56 in electrical contact with one of the contact springs 44. As shown in FIG. 4, the contact springs 44 have been pushed into a deflected orientation by the contacts 56. For the purpose of this application, the phrase "deflected orientation" is intended to mean the orientation of the contact springs 44 when the plug 50 is inserted within the port 52. For clarity, the insert body 36 is not shown in FIG. 4.

Electrical contact between the contacts 56 and the contact springs 44 is preferably made along a simple line of contact 58. The line of contact 58 is best shown schematically at FIG. 5A. For clarity purposes, the plug 50 is not shown in FIG. 5A such that the springs 44 are more clearly visible.

Figures 5A, 5B, 5C:
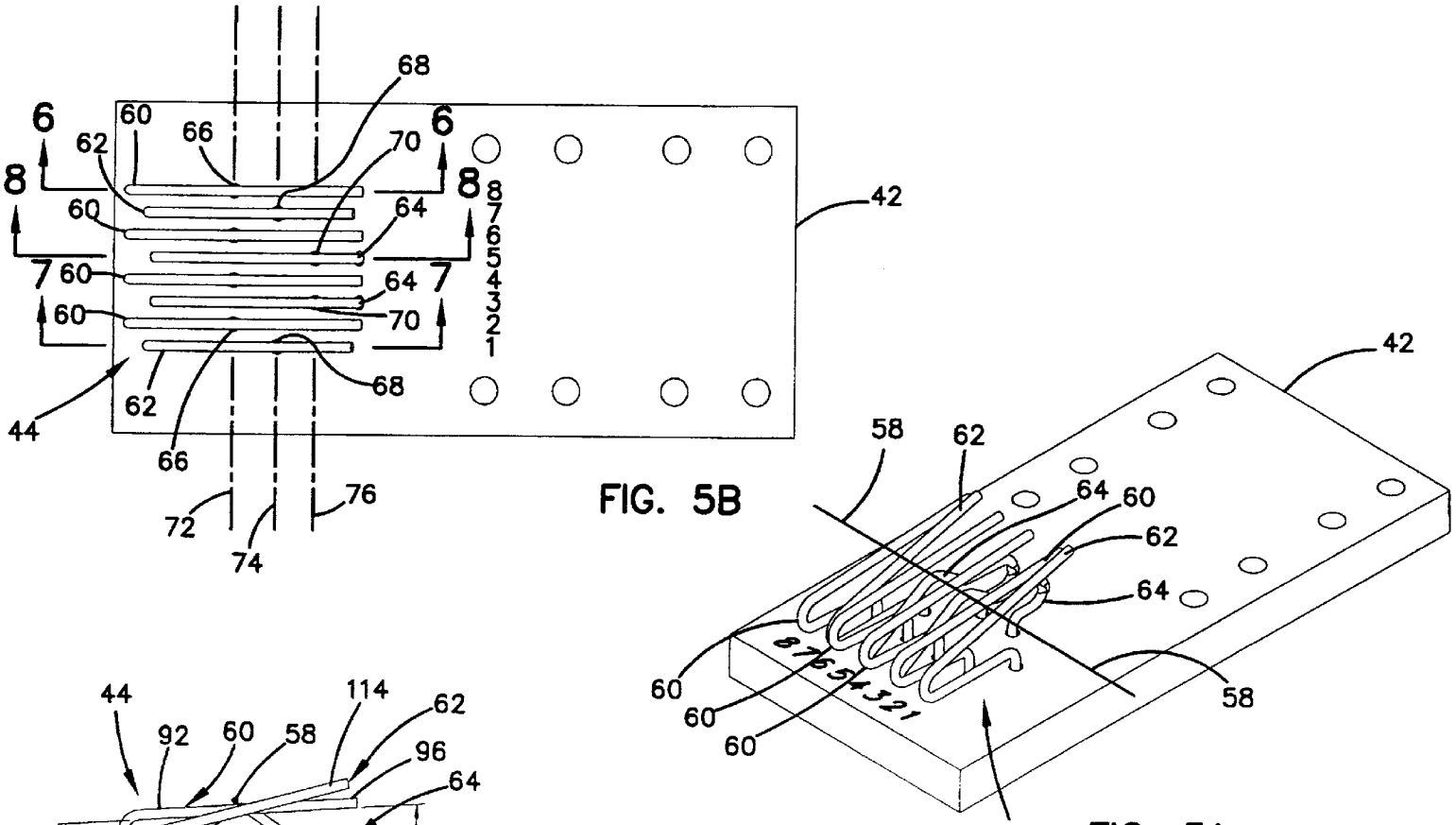
FIG. 5A is a perspective view of the springs and circuit board of the modular jack of FIG. 2, the springs are illustrated in a deflected orientation.
FIG. 5B is a top, plan view of the springs and circuit board of FIG. 5A.
FIG. 5C is an elevational view of the circuit board and deflected springs of FIG. 5A.

FIGS. 5A-5C illustrate the circuit board 42 and the contact springs 44 in isolation from the remainder of the modular jacks 30. In all of FIGS. 5A-5C, the contact springs 44 have been depicted in the deflected orientation of FIG. 4.

Figure 1:
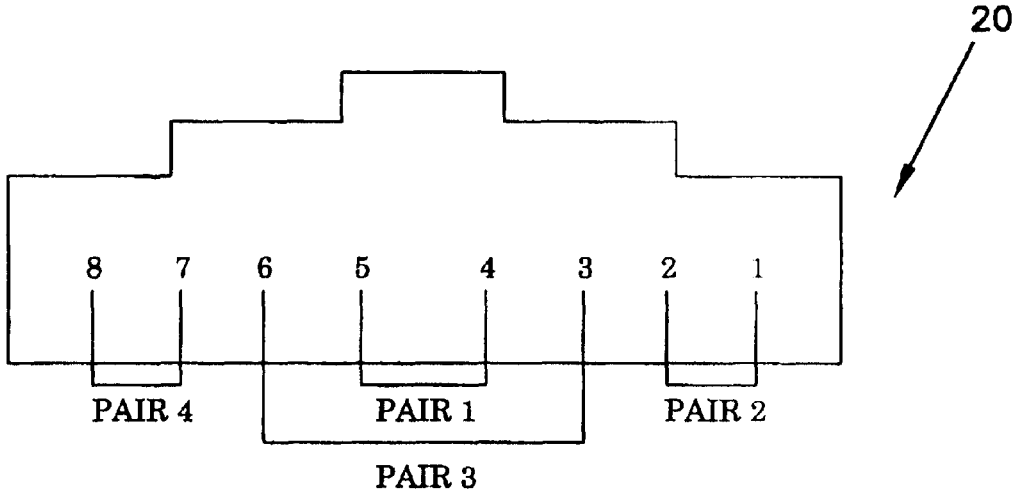
FIG. 1 schematically shows a prior art modular jack.

Referring now to FIG. 5B, the contact springs 44 are located at eight separate spring positions numbered 1–8. Similar to the prior art pin assignment of FIG. 1, the contact springs at positions 4 and 5 preferably form a first pair, the contact springs at positions 3 and 6 preferably perform a second pair, the contact springs at positions 1 and 2 preferably form a third pair, and the contact springs at positions 7 and 8 preferably form a fourth pair. Other pairings can also be used.

The contact springs 44 preferably include springs having three different geometric configurations. For example, the contact springs 44 are shown including four front springs 60, two middle springs 62 and two rear springs 64. Preferably, the front springs 60 are located at spring positions 2, 4, 6 and 8; the middle springs 62 are located at spring positions 1 and 7; and the rear springs 64 are located at spring positions 3 and 5. As will be described later in the specification, the front and middle springs 60 and 62 preferably comprise rearwardly extending springs, and the rear springs 64 preferably comprise forwardly extending springs.

Referring again to FIG. 5B, the front, middle and rear springs 60, 62 and 64 respectively include terminal ends 66, 68 and 70 (i.e., posts) that terminate within the circuit board 42. The terminal ends 66 of the front springs 60 are aligned along a front reference line 72, the terminal ends 68 of the middle springs 62 are aligned along a middle reference line 74, and the terminal ends 70 of the rear springs 64 are aligned along a rear reference line 76. The middle reference line 74 is positioned between the front and rear reference lines 72 and 76. Preferably, the reference lines 72, 74 and 76 are substantially parallel. The spacing between the reference lines 72, 74 and 76 provide staggering between the terminal ends 66, 68 and 70. This staggering is advantageous because additional space is provided for terminating the spacings 44 at the circuit board 42 (e.g., clearance for solder pads is provided). Clearance is also provided for allowing transmission lines to be passed between the springs 44.

Figure 6:
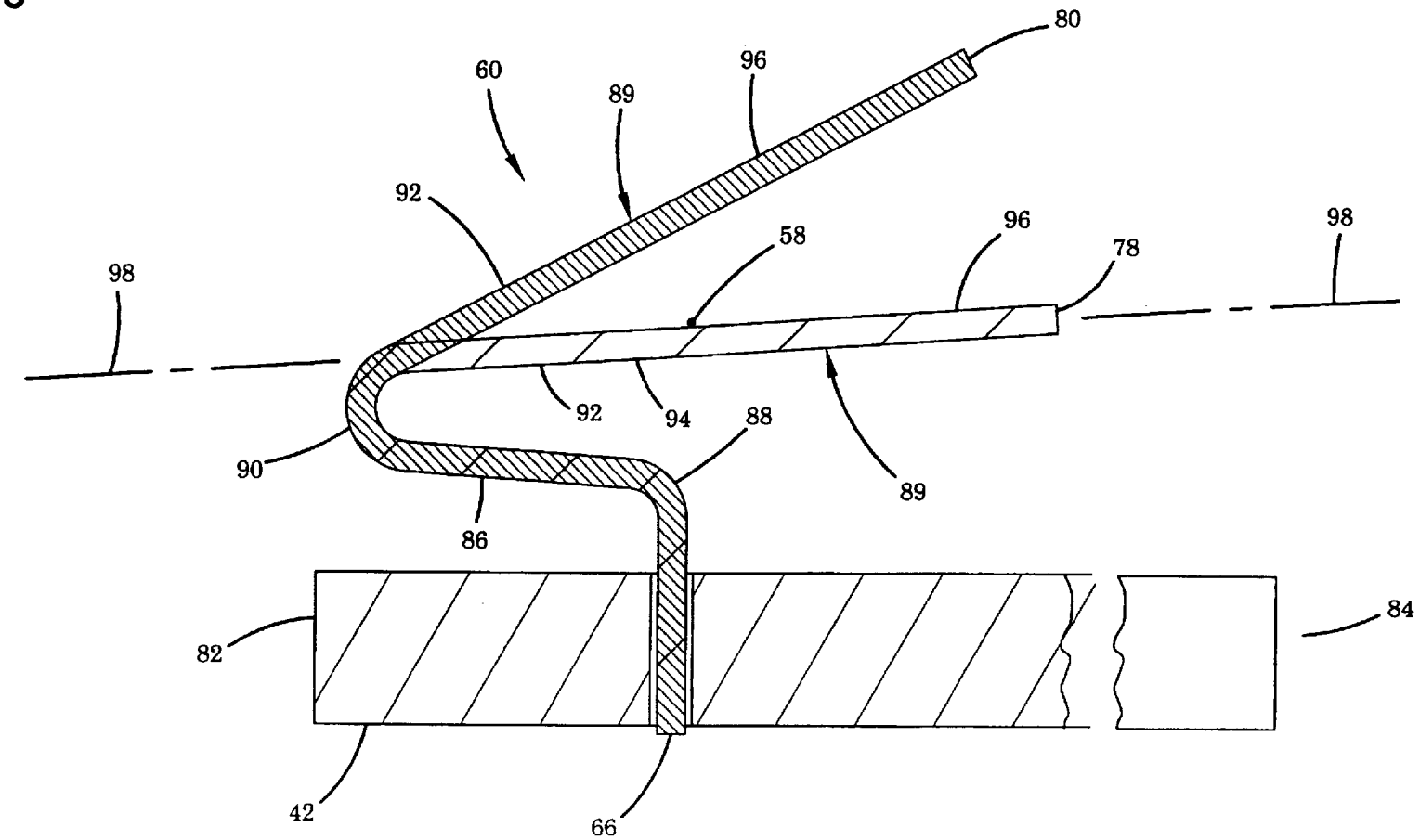
FIG. 6 is a cross-sectional view taken along section line 6—6 of FIG. 5B, the spring is shown in a deflected orientation and in a non-deflected orientation.

FIG. 6 shows one of the front springs 60 in both a deflected orientation 78 and in a non-deflected orientation 80. The terminal end 66 of the front spring 60 is shown extending through the circuit board 42. The circuit board 42 includes a front end 82 adapted to be positioned at the front side 54 of the housing 32 and a rear end 84 adapted to be positioned at the rear side 31 of the housing 32.

Referring still to FIG. 6, the terminal end 66 of the front spring 60 extends vertically upward from the circuit board 42. A forward extension 86 extends in a forward direction from the terminal end 66. A first bend 88 (e.g., a bend of about 90 degrees) interconnects the terminal end 66 and the forward extension 86. The forward extension 86 preferably extends slightly upward as it extends in the forward direction. A second bend 90 reverses the direction in which the forward extension 86 extends. For example, the second bend reverses the direction of the spring 60 from a forward direction at the forward extension 86, to a rearward direction at a proximal portion 92 of the front spring 60.

The proximal portion 92 extends from the second bend 90 to a contact region 94 that corresponds to the line of contact 58 at which the spring 60 will contact its respective contact 56 of the plug 50. The spring 50 further includes a distal portion 96 that extends from the contact region 94 toward the rear end 84 of the circuit board 42. Preferably, the proximal and distal portions 92 and 96 are aligned along a single straight line 98.

The front spring 60 can be referred to as a rearwardly extending spring because the distal portion 96 extends from the contact region 94 toward the rear end 84 of the circuit board 42. The proximal and distal portions 92 and 96 cooperate to form an upper resilient cantilever 89 having a base at the second bend 90. When moving between the deflected and non-deflected orientations 78 and 80, the cantilever 89 flexes primarily it's base (e.g., at the second bend 90).

Figure 7:
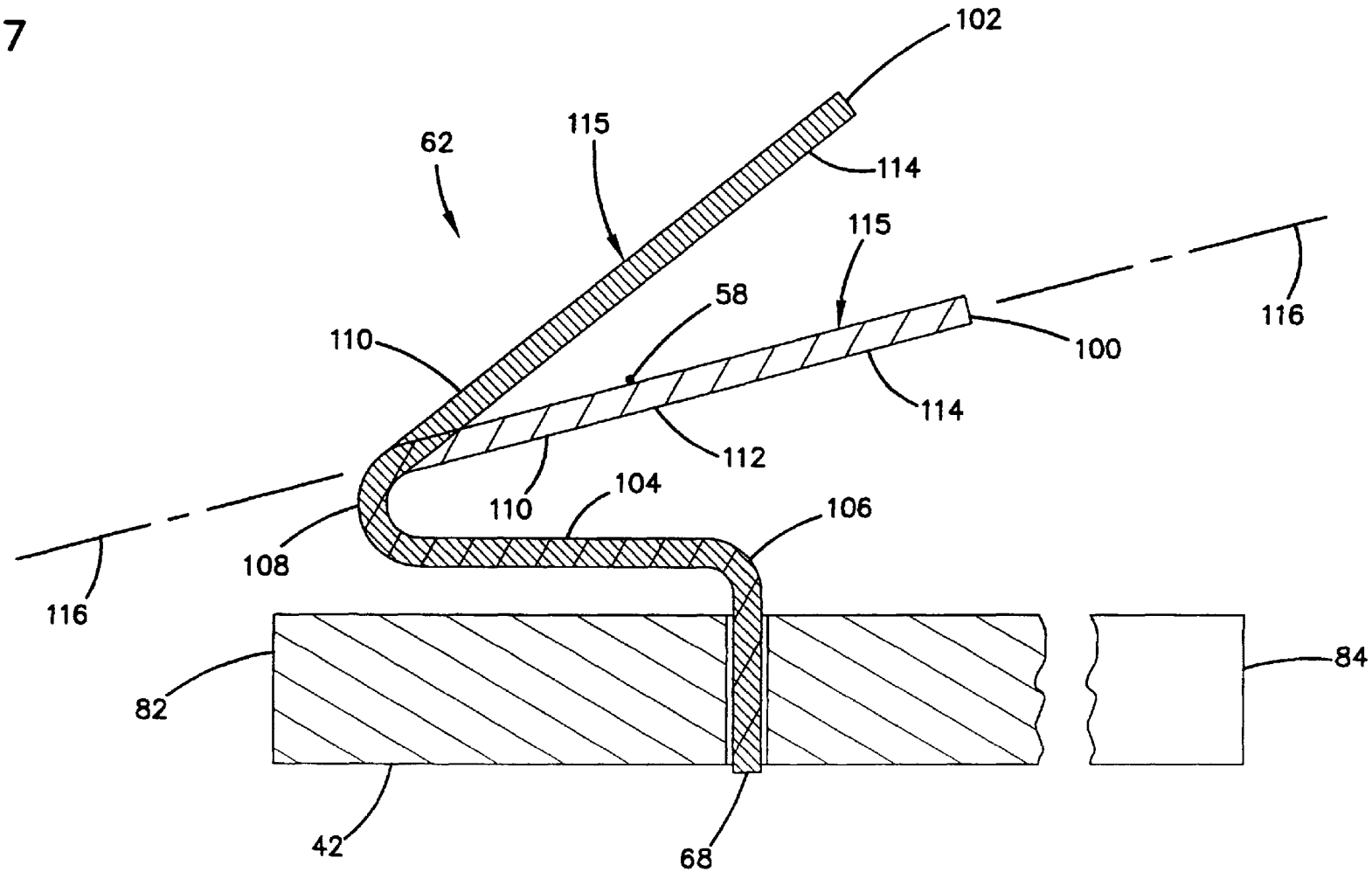
FIG. 7 is a cross-sectional view taken along section line 7—7 of FIG. 5B, the spring is shown in a deflected orientation and in a non-deflected orientation.

FIG. 7 illustrates one of the middle springs 62 in both a deflected orientation 100 in a non-deflected orientation 102. The terminal end 68 of the middle spring 62 extends vertically upward from the circuit board 42. A forward extension 104 extends in a forward direction from the terminal end 68. At first bend 106 (e.g., approximately a 90 degree bond) provides a transition between the terminal end 68 and the forward extension 104. A second bend 108 reverses the direction of extension of the forward extension 104. From the second bend 108, a proximal portion 110 of the middle spring 62 extends in a rearward direction to a contact region 112 that corresponds to the line of contact 58 at which the spring 62 will contact its respective contact 56 of the plug 50.

A distal portion 114 of the contact spring 62 extends from the contact region 112 in a rearward direction toward the rear end 84 of the circuit board 42. Preferably, the proximal portion 110 and the distal portion 114 are aligned along a single straight line 116 and form an upper cantilever 115 having a base end at the second bend 108. When moving between the deflected and non-deflected orientation 100 and 102, the cantilever 115 flexes primarily at the second bend 108. The spring 62 can be referred to as a rearwardly extending spring because the distal portion 114 extends in a rearward direction from the contact region 112.

Figure 8:
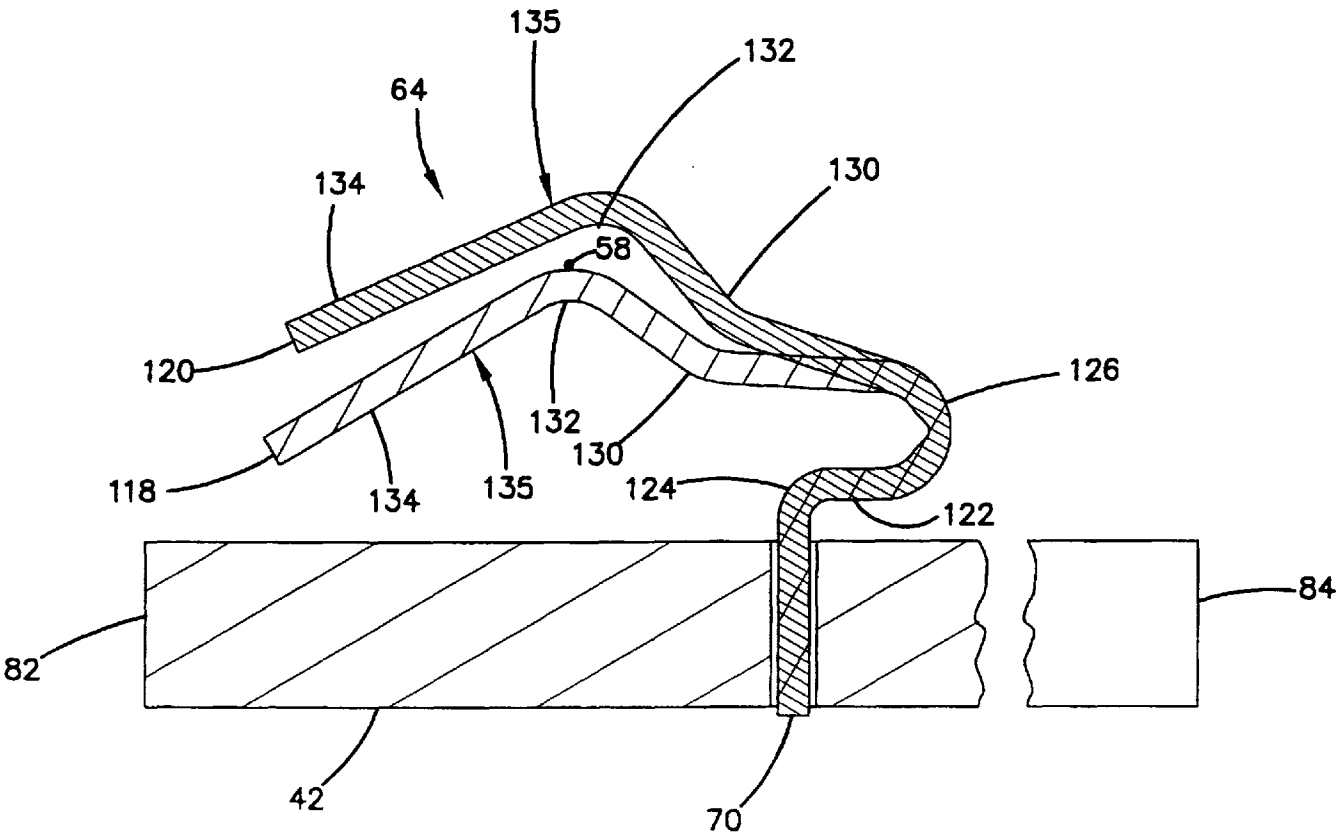
FIG. 8 is a cross-sectional view taken along section line 8—8 of FIG. 5B, the spring is shown in a deflected orientation and in a non-deflected orientation.

FIG. 8 illustrates one of the rear springs 64 in both a deflected orientation 118 and a non-deflected orientation 120. The terminal end 70 of the rear spring 64 extends perpendicularly from the circuit board 42. A rearward extension 122 extends in a rearward direction from the terminal end 70. A first bend 124 (e.g., about a 90° bend) provides a transition between the terminal end 70 and the rearward extension 122. A second bend 126 reverses the direction of extension of the rearward extension 122. A proximal portion 130 extends from the second bend 126 in a forward direction to a contact region 132 of the spring 64. The contact region 132 corresponds to the line of contact 58 at which the spring 64 will electrically contact one of the contacts 56 of the plug 50. A distal portion 134 of the rear spring 64 preferably extends in a forward direction from the contact region 132 toward the front end 82 of the circuit board 42.

The distal and proximal portions 134 and 130 are not aligned along a common straight line. Instead, the proximal and distal portions 130 and 134 are preferably aligned at an obtuse angle relative to one another. The contact region 132 is located at an apex between the proximal and distal portions 130 and 134, and the proximal and distal portions 130 and 134 extend away from the contact region 132 in a direction generally toward the circuit board 42. The proximal and distal portions 130 and 134 form a cantilever 135 having a base end at the second bend 126. When moving between the deflected and non-deflected orientations 118 and 120, the cantilever 135 flexes primarily at the second bend 126. The spring 64 can be referred to as a forwardly facing spring because the distal portion 134 extends in a forward direction from the contact region 132.

Referring to FIG. 5C, the contact spring 44 are shown in a deflected orientation. As illustrated, the distal portions 96 of the front springs 60 (i.e., the rearwardly facing contact springs) define an angle $\theta_1$ relative to the proximal portions 130 of the rear springs 64 (i.e., the forwardly facing contact springs) that is preferably greater than 10°. In other embodiments, the angle $\theta_1$ is greater than 15°, 20°, 25°, 30°, or 35°. In one particular embodiment of the present invention, the angle θis about 38.5°.

Referring still to FIG. 5C, proximal portions 92 of the front springs 60 (i.e., the rearwardly facing contact springs) define an angle $\theta_2$ relative to the distal portions 134 of the rear springs 64 (i.e., the forwardly facing contact springs) that is preferably greater than 10°. In certain embodiments of the present invention, the angle $\theta_2$ is greater than 15°, 20° or 25°. In one particular embodiment of the present invention, the angle $\theta_2$ is about 26.6°.

To further reduce crosstalk, it is also noted that the distal portions 114 of the middle springs 62 are arranged in a non-parallel relationship with respect to the distal portions 96 of the front springs 60. Additionally, the proximal portions 110 of the middle springs 62 are arranged in a non-parallel relationship with respect to the proximal portions 92 of the front springs 60.

The above-described configurations assist in reducing crosstalk between the springs located at positions 3–6 because the distal portions 96 of the front springs 60 relatively quickly diverge from a parallel relationship with respect to the proximal portions 130 of the rear springs 64, and the proximal portions 92 of the front springs 60 relatively quickly diverge from a parallel relationship with respect to the distal portions 134 of the rear springs 64. The divergence preferably initiates as the springs 60, 64 extend away from the line of contact 58. Therefore, significant portions of the springs 60 and 64 are spaced relatively far apart thereby reducing the intensity of capacitive coupling.

As shown in FIG. 5B, the front springs 60 are shown at positions 3 and 5. It will be appreciated that this positioning could be reversed such that the front springs 60 are located at positions 3 and 5, and the rear springs 64 are located at positions 4 and 6. Also, in other embodiments, forwardly extending springs can be used at positions 1, 2, 7 and 8; and forwardly and rearwardly extending contacts can be alternated at positions 3–6. In still another embodiment, forwardly extending contacts and rearwardly extending contacts can be alternated throughout positions 1–8.

Figure 10:
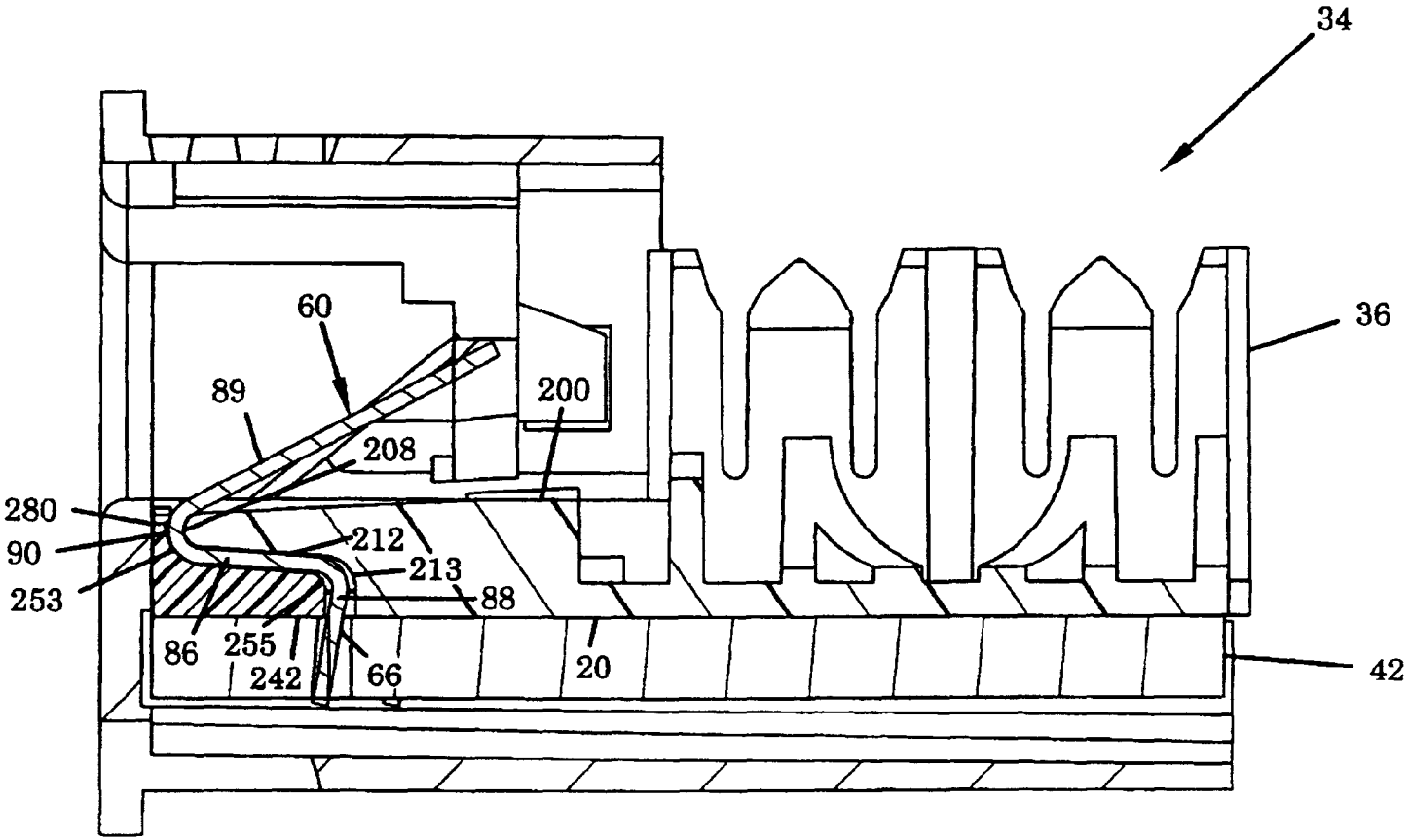
FIG. 10 is a cross-sectional view of the jack of FIGS. 2A and 2B with the jack being cut through one of the front springs.
Figure 11:
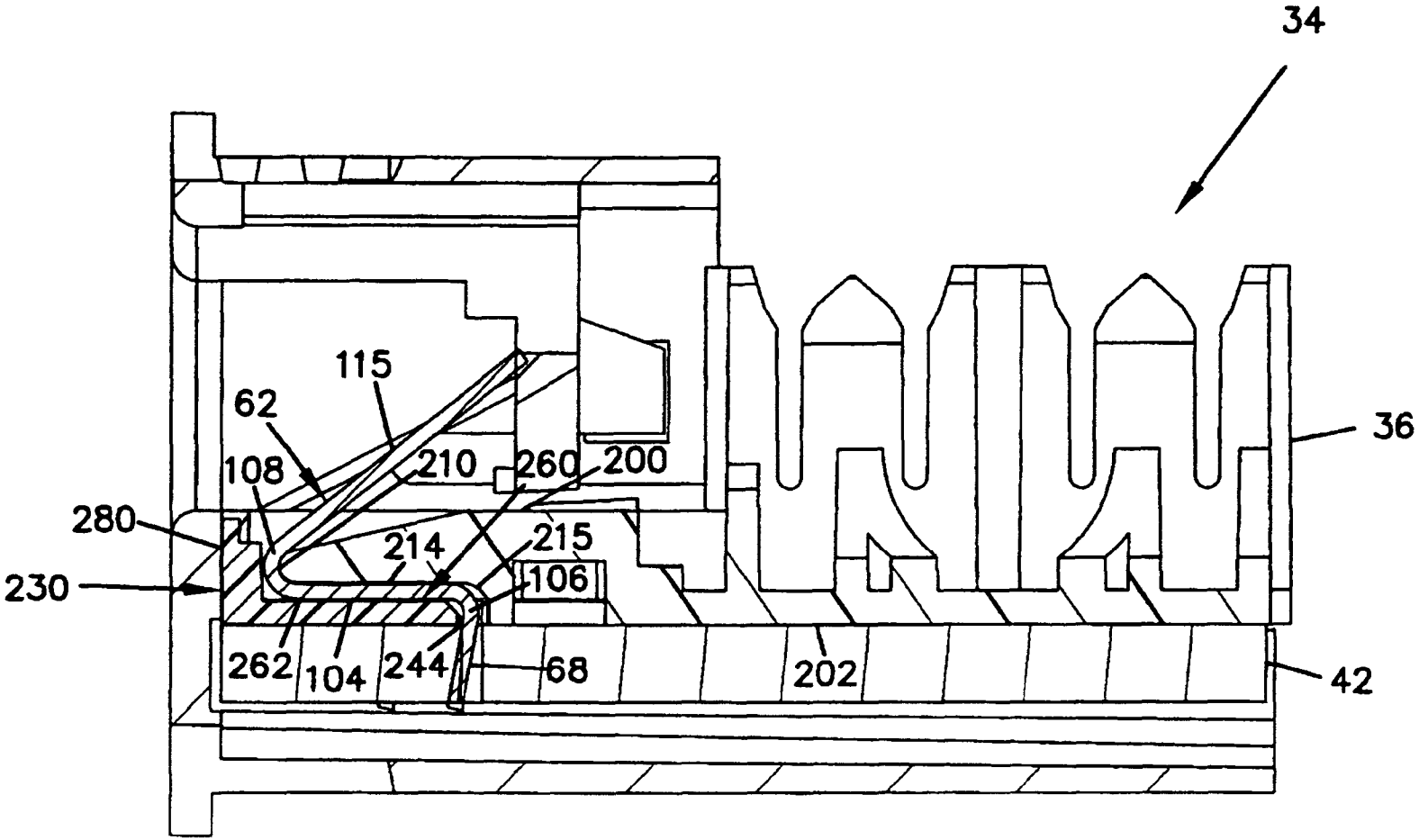
FIG. 11 is a cross-sectional view of the jack of FIGS. 2A and 2B with the jack being cut through one of the middle springs.

The insert body 36 of the jack 30 is preferably made of a dielectric material such as polycarbonate. The insert body 36 includes a top side 200 (shown in FIG. 9A) and a bottom side 202 (shown in FIG. 9B). The insert body also includes a front end 204 (i.e., a spring supporting end) positioned opposite from a rear end 206. The front end 204 is preferably configured to assist in holding the springs 44 in the configuration of FIGS. 5A–5C. For example, as best shown in FIG. 9A, the front end 104 of the insert body 36 includes four front spring bend guides 208 and two middle spring bend guides 210. As shown in FIG. 10, the front spring bend guides 208 are preferably radiused (i.e. curved) to complement and support the second bends 90 of the front springs 60. As shown in FIG. 11, the middle spring bend guides 210 are preferably radiused to complement and support the second bends 108 of the middle springs 62. The middle spring bend guides 210 are preferably rearwardly and downwardly offset relative to the front spring bend guides 208.

Figure 9B:
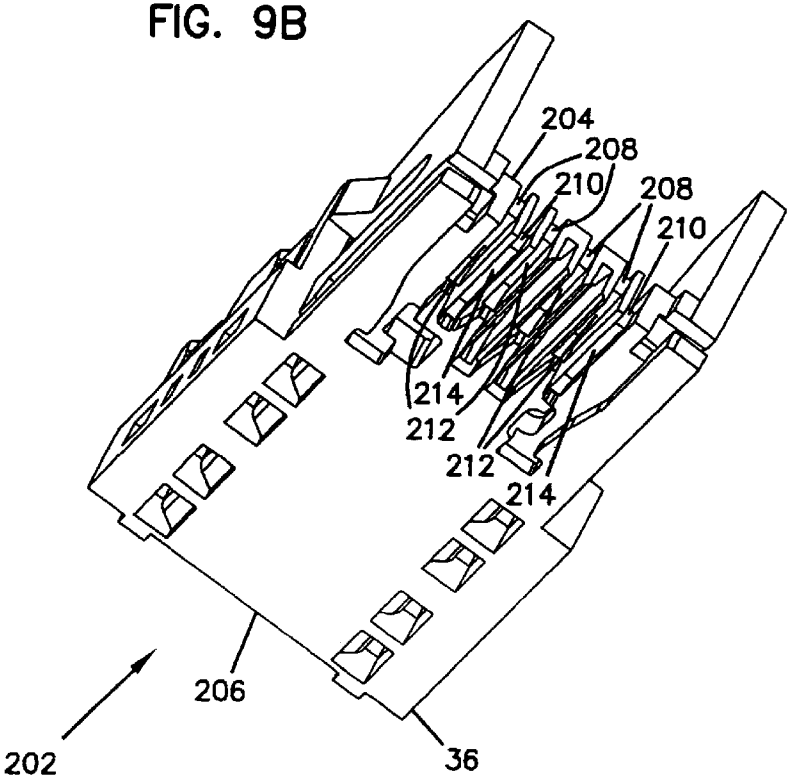
FIG. 9B is a bottom, front perspective view of the insert body of FIG. 9A.
Figure 9A:
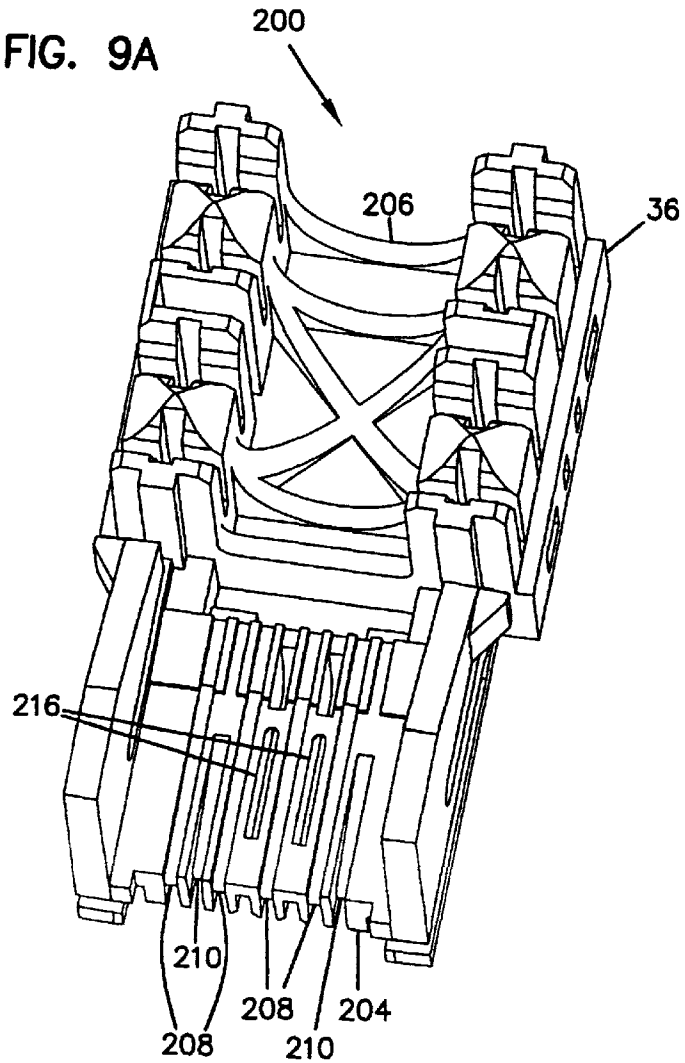
FIG. 9A is a front, top perspective view of an insert body constructed in accordance with the principles of the present invention.

Referring to FIG. 9B, the bottom of the insert body 36 also includes structure for maintaining the springs 44 in the configurations of FIGS. 5A–5C. For example, the bottom side 202 includes four front spring channels 212 for receiving the forward extensions 86 of the front springs 60. FIG. 10 shows the forward extension 86 of one of the front springs 60 positioned in one of the front spring slot 212. As also shown in FIG. 10, rear side ends 213 of the front spring slots 212 are radiused to match the curvatures of the first bends 88 of the front springs 60.

The bottom side 202 also defines two middle spring channels 214 for receiving the forward extension 104 of the middle springs 62. FIG. 11 shows the forward extension 104 of one of the middle springs 62 positioned in one of the middle spring channels 214. As shown in FIG. 11, rear ends 215 of the middle spring channels 214 are radiused to match the curvatures of the first bends 106 of the middle springs 62. The middle spring channels 214 are preferably adapted to position the forward extension 104 of the middle springs 62 at a lower elevation than the forward extension 86 of the front springs 60.

Figure 12:
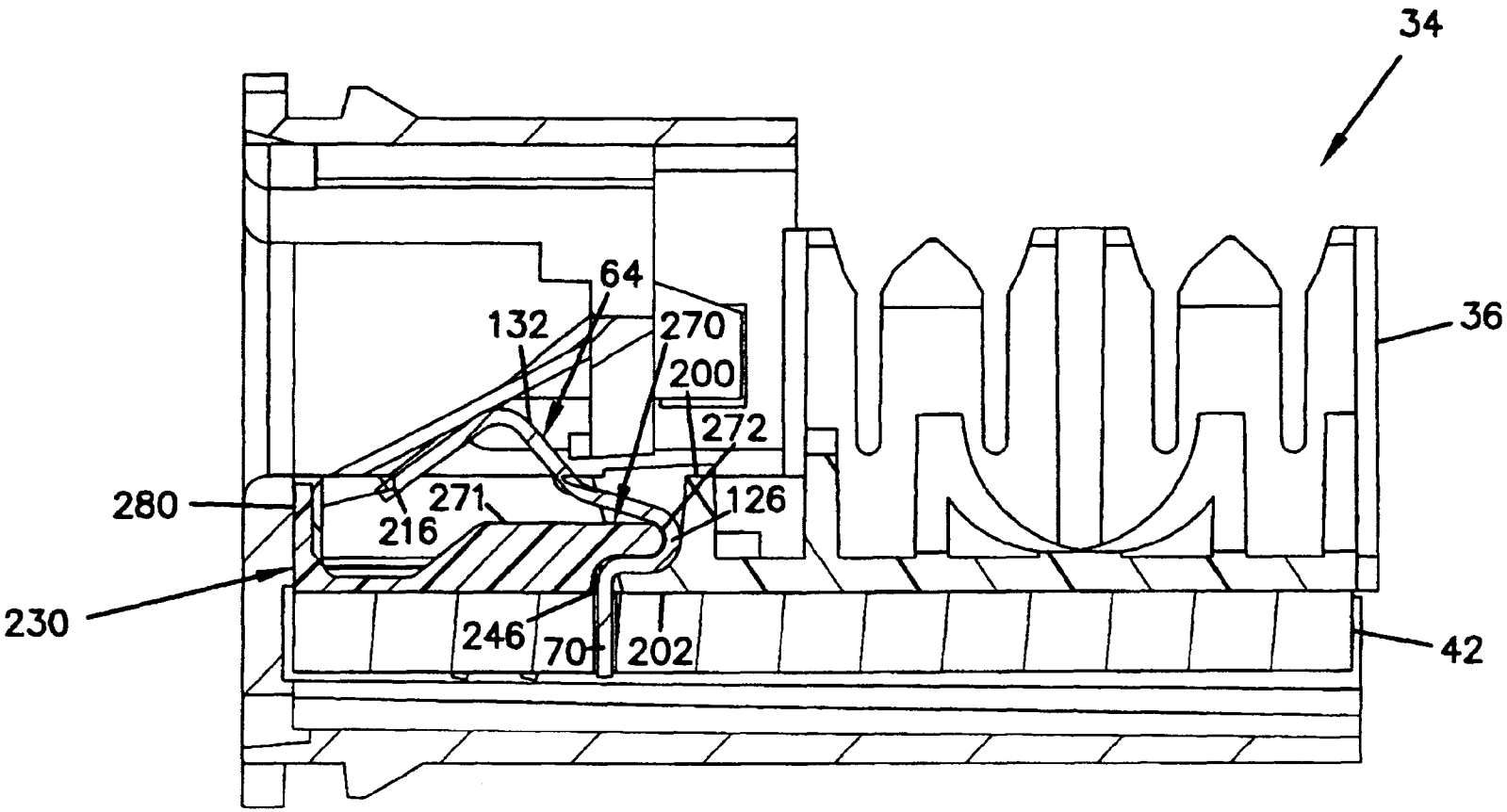
FIG. 12 is a cross-sectional view of the jack of FIGS. 2A and 2B with the jack being cut through one of the rear springs.

The insert body 36 further defines two rear spring slots 216 for receiving the contact regions 132 of the rear springs 64. As shown in FIG. 12, the rear spring slots 216 extend completely through the inner body 36 such that the contact regions 132 of the rear springs 64 can extend from the bottom side 202 of the insert body to the top side 200 of the insert body 36.

The springs 44 are secured (i.e., fastened, retained, otherwise held in place) to the insert body 36 by the retaining clip 230. The clip 230 also stabilizes the springs 44 (i.e., the clip 230 resists movement of at least portions of the springs 44). The term "clip" will be understood to mean a number that is manufactured as a separate piece from the insert body 36 and, that is engageable with the insert body 36. The clip is preferably made of a dielectric material such as polycarbonate.

To assemble the springs on the insert body 36, the springs 44 are mounted within their respective spring retaining structure defined on the insert body 36. For example, the second bends 90 of the front springs 60 are inserted over the bend guides 208 (see FIG. 10). As so inserted, the forward extensions 86 of the front springs 60 fit within the front spring channels 212 beneath the insert body 36 and the cantilever portions 89 extend above the top side 200 of the insert body 36. Similarly, the second bends 108 of the middle springs 62 are inserted over the middle spring bend guides 210 (see FIG. 11). As so inserted, the forward extension 104 of the middle springs 62 fit within the middle spring channels 214 and the cantilever portions 115 project above the top side 200 of the insert body 36. The rear springs 64 are positioned such that the contact portions 132 extend through the slots 216 defined by the insert body 36 (see FIG. 12).

Figure 13:
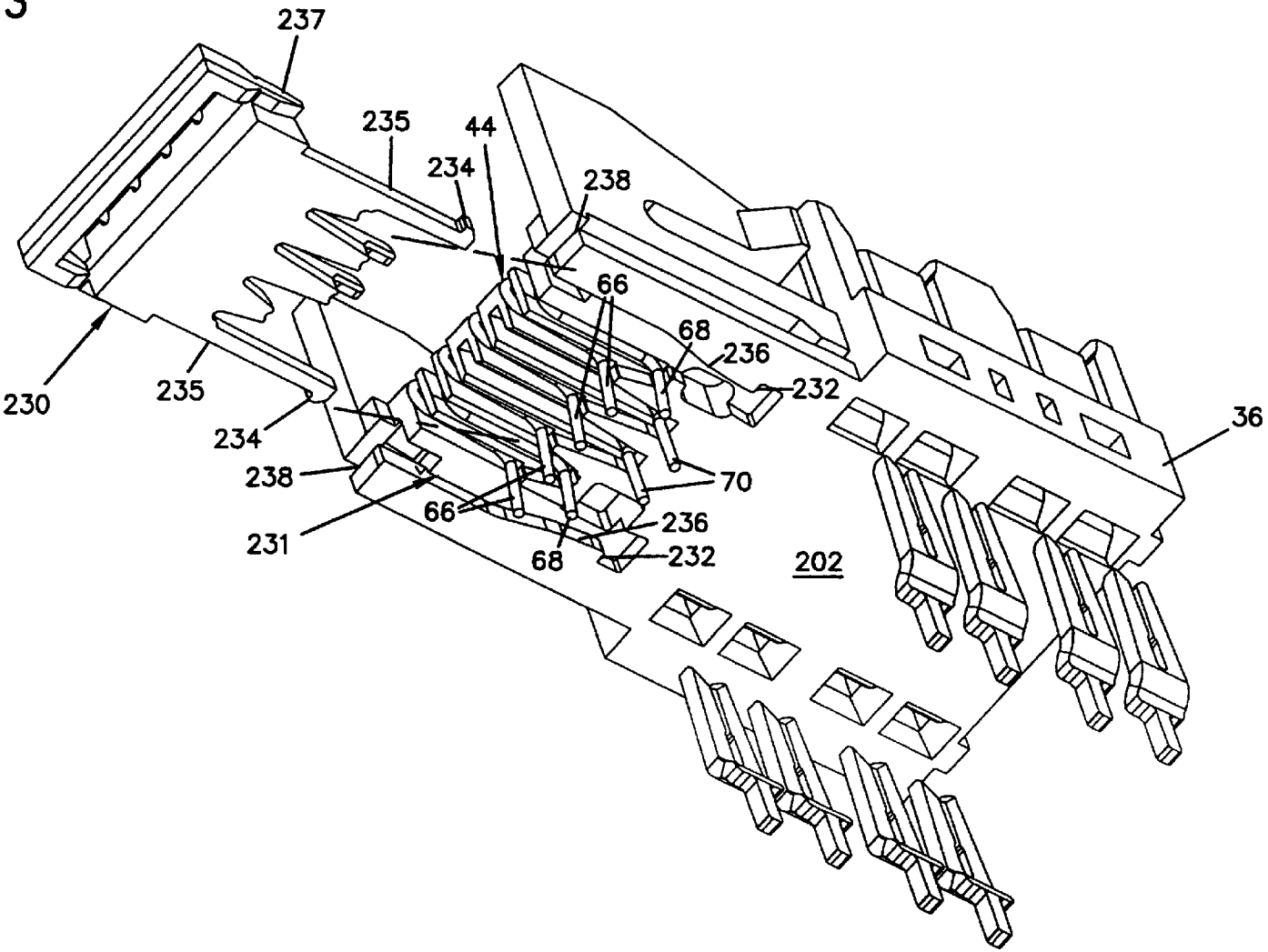
FIG. 13 is a bottom perspective view of the insert body of FIGS. 9A and 9B with contact springs mounted therein.

FIG. 13 shows the springs 44 positioned on the insert body 36 as described above. As shown in FIG. 13, the termination posts 66, 68 and 70 of the springs 44 project outwardly from the bottom side 202 of the insert body 36. During the assembly process, the clip 230 is used to retain the springs 44 in the position of FIG. 13. To secure the springs 44 with the clip 230, the clip is inserted in a rearward direction into a clip receiving structure 231 defined by the insert body 236. The clip receiving structure 231 includes shoulders 232 that interlock with tabs 234 of the clip 230 to prevent the clip 230 from being forwardly dislodged from the clip retaining structure 231. The tabs 234 are positioned on the end of flexible arms 235 that flex inwardly as the retaining clip 230 is inserted into the clip retaining structure 231. Specifically, during insertion of the clip 230, the tabs 234 engage ramped surfaces 236 of the shoulders 232 causing the arms 235 to flex inwardly. Once the tabs 234 pass the shoulders 232, the arms 235 snap outwardly to provide a snap fit connection.

Figure 15:
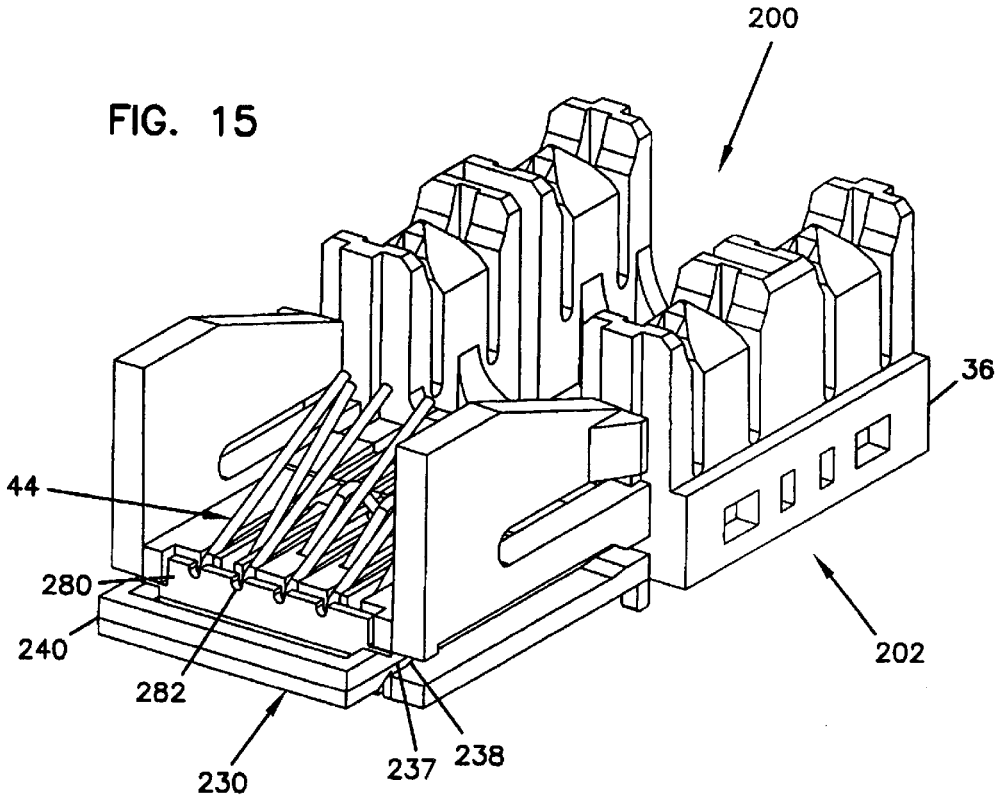
FIG. 15 is a perspective view of the insert body of FIGS. 9A and 9B with springs secured thereto by a retainer clip.

With the retaining clip 230 inserted within the clip receiving structure 231, portions of the springs 44 are captured between the clip 230 and the bottom side 202 of the insert body. The clip 230 is prevented from being downwardly displaced from the clip receiving structure 231 by side wedges 237 that fit within the notches 238 of the insert body 36 when the retaining clip 230 is fully inserted within the clip retaining structure 231. FIG. 15 shows one of the side wedges 237 inserted within one of the notches 238.

Figure 14:
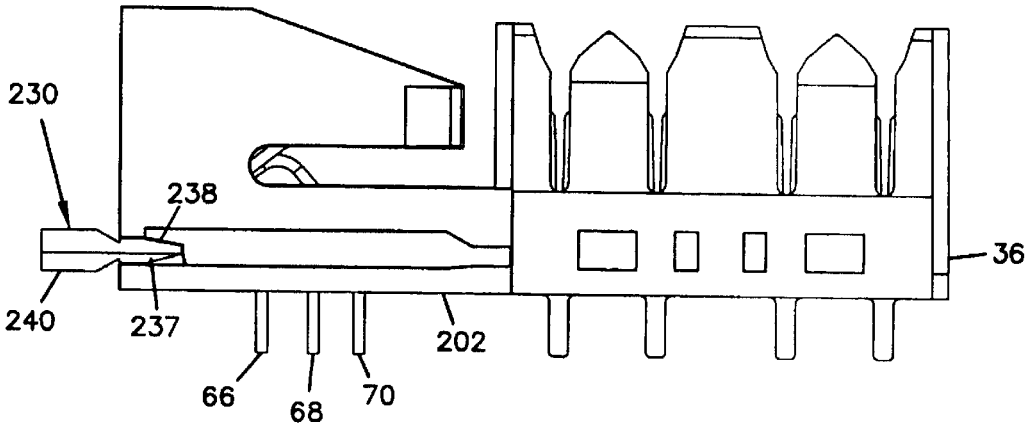
FIG. 14 is a side elevational view of the insert body of FIGS. 9A and B with springs secured thereto by a retainer clip.

FIGS. 14 and 15 show the clip 230 fully inserted within the insert body 36. As shown in FIGS. 14 and 15, the retaining clip 230 includes a handle 240. The handle 240 facilitates inserting the clip 230 within the clip receiving structure 231. After insertion, the handle can be removed from the remainder of the retaining clip 230 by conventional techniques such as cutting or otherwise breaking the handle 230 from the retaining clip 230.

Figure 16A:
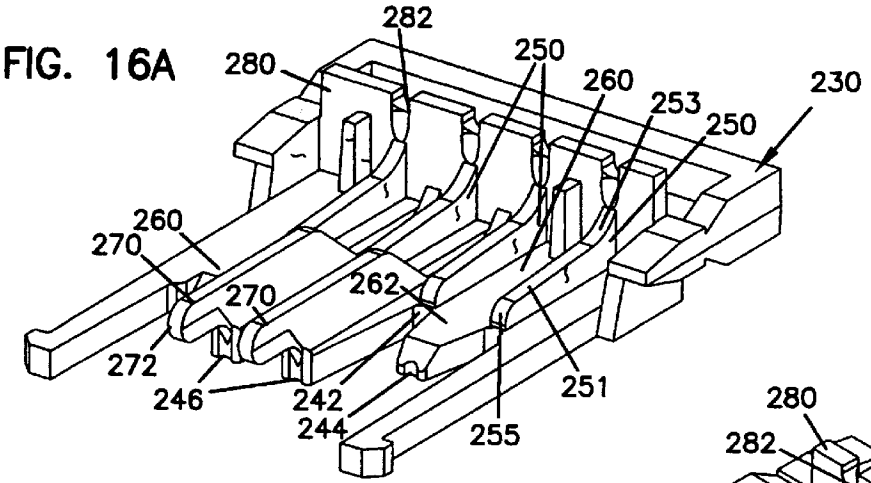
FIG. 16A is a rear, top perspective view of the retainer clip of FIGS. 14 and 15.
Figure 16B:
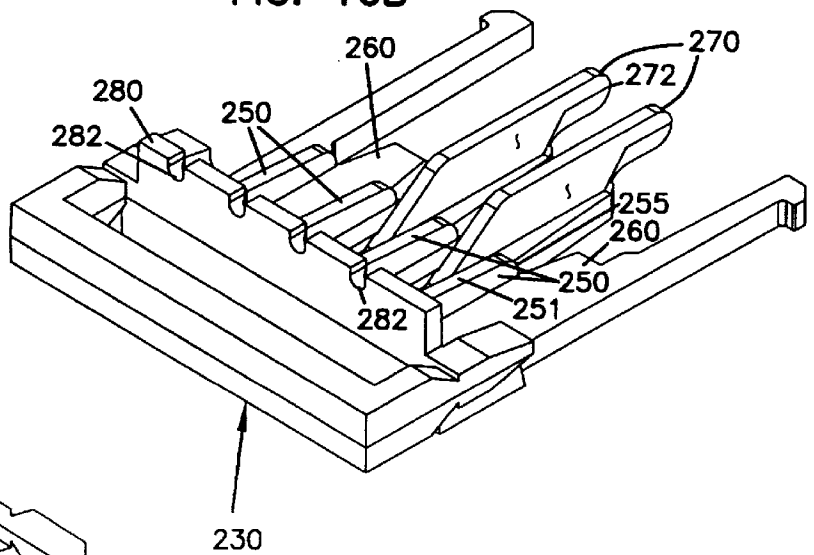
FIG. 16B is a front, top perspective view of the retainer clip of FIG. 16A.
Figure 16C:
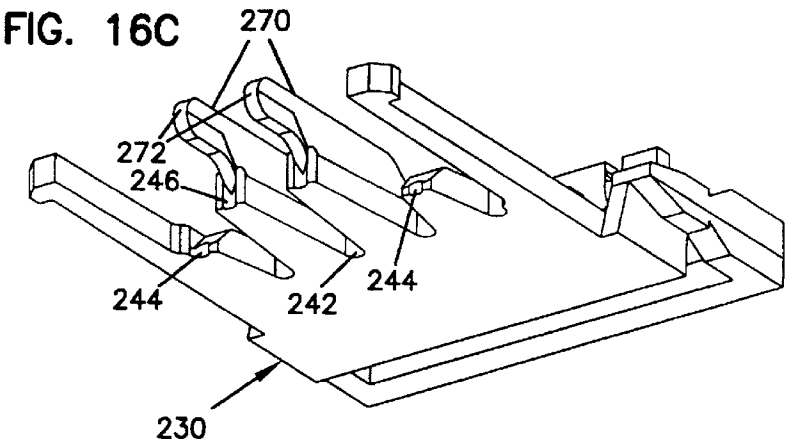
FIG. 16C is a rear, bottom perspective view of the retainer clip of FIG. 16A.
Figure 16E:
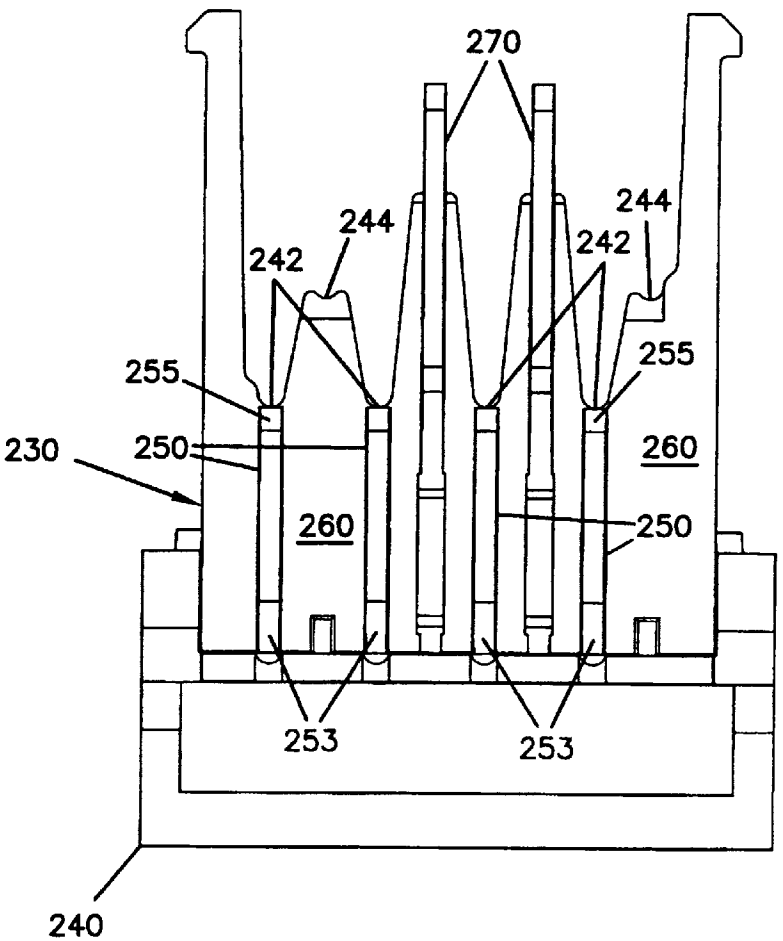
FIG. 16E is a top plan view of the retainer clip of FIG. 16A.
Figure 16D:
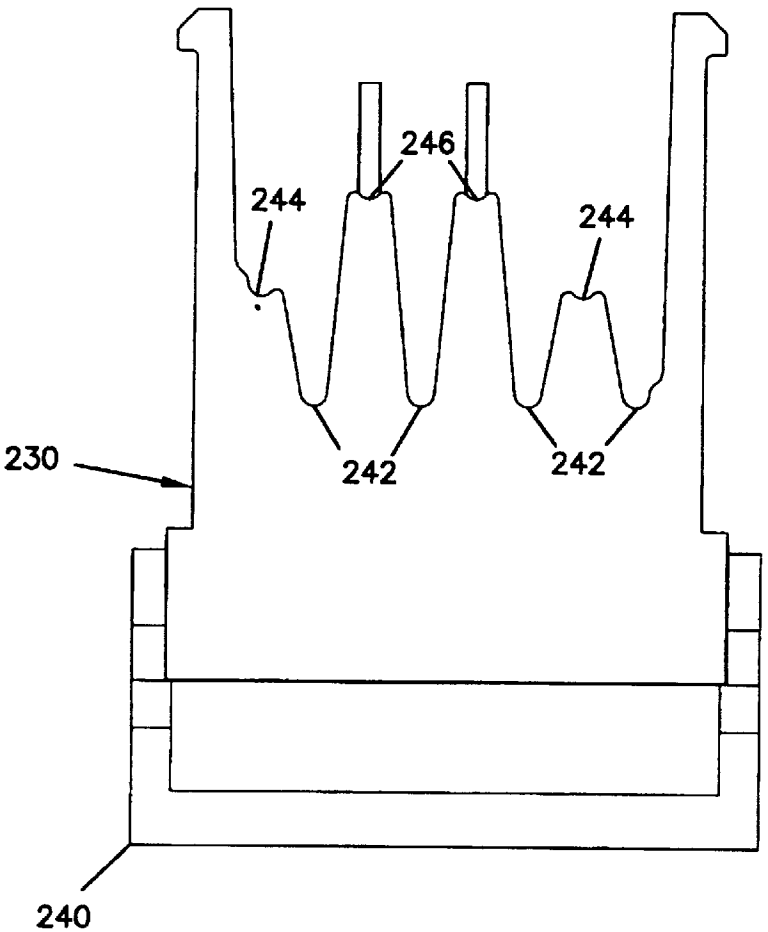
FIG. 16D is a bottom plan view of the retainer clip of FIG. 16A.

Referring to FIGS. 16D and 16E, the retaining clip 230 includes a plurality of post retainers for precisely maintaining the position of the termination posts 66, 68 and 70 of the springs 44. For example, the post retainers include four front post retainers 242 adapted to engage and position the terminal posts 66 of the front springs 60 (see FIG. 10). Still referring to FIGS. 16D and 16E, the clip 230 also includes two middle post retainers 244 and two rear post retainers 246. The middle post retainers 244 are adapted to engage and position the terminal posts 68 of the middle springs 62 (see FIG. 11). The rear post retainers 246 are adapted to engage and position the terminal posts 70 of the rear springs 64 (see FIG. 12). All of the post retainers 242, 244 and 246 include structure for receiving or cradling the terminal end posts 66, 68, and 70. For example, as shown, the post retainers 42, 44 and 46 each have a concave, notched configuration. However, any type of notch or other structure could also be used.

The retaining clip 230 also includes structures for trapping or pressing portions of the springs 44 against the bottom side 202 of the insert body 36. For example, as shown in FIGS. 16A–16C, the clip 230 includes four front spring supports 250 for capturing the front springs 60, two middle spring supports 260 for capturing the middle springs 62, and two rear springs supports 270 for capturing the rear springs 64.

The front spring supports 250 are positioned in alignment with the front post retainers 242. As shown in FIG. 10, the front spring supports 250 include inclined planar portions 251 for pressing the forward extensions 86 of the forward springs 60 upwardly into their corresponding front spring channels 212 defined beneath the insert body 36. The front spring supports 250 also include front curvatures 253 for supporting the second bends 90 of the front springs 60, and rear curvatures 255 corresponding to the first bends 88 of the front springs 60.

The middle springs supports 260 are positioned in alignment with the middle post retainers 244. As shown in FIG. 11, the middle spring supports 260 include planar support surfaces 262 that press the forward extension 104 of the middle springs 62 into their corresponding middle spring channels 214 defined beneath the insert body 36. Rear ends of the middle spring support structures 260 are tapered to accommodate the second bends 106 of the middle springs 62. The planar support surfaces 261 are preferably positioned lower than the planar support surfaces 251 of the front spring supports 250.

The rear spring supports 270 are positioned in alignment with the rear post retainers 246. As shown in FIG. 12, the rear spring supports 270 include rounded noses 272 for supporting the second bends 126 of the rear springs 64. Planar support surfaces 271 of the rear spring supports 270 are preferably positioned higher than the planar support surfaces 251 of the front spring supports 250. The spring supports 270 press portions of the rear springs 64 against the underside of the insert body 36, and prevent the distal tips of the rear springs 64 from contacting the circuit board 44.

The retaining clip 230 further includes a front flange or lip 280 that covers and protects the second bends 90 and 108 of the front and middle springs 60 and 62 when the clip 230 is fully inserted within the clip receiving structure 231 of the insert body 36. The lip 280 projects upwardly from the spring supports 250, 260 and 270. Notches 282 are defined at a top edge of the lip 280 for providing clearance for the front springs 60.

Figure 18:
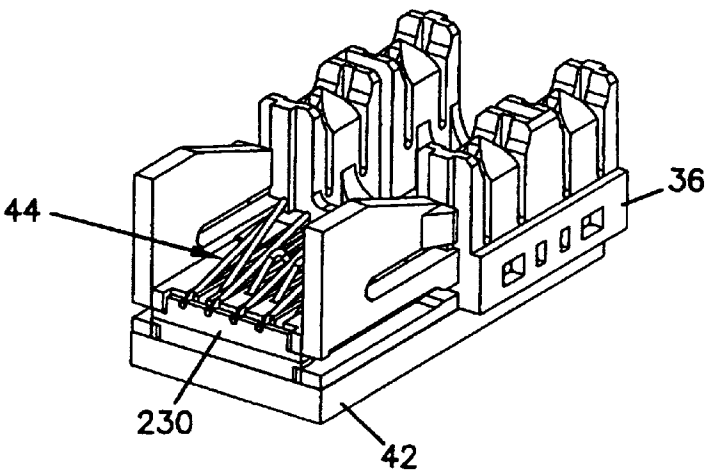
FIG. 18 is a front, perspective view showing the printed circuit board and insert body of FIG. 17 connected together.
Figure 17:
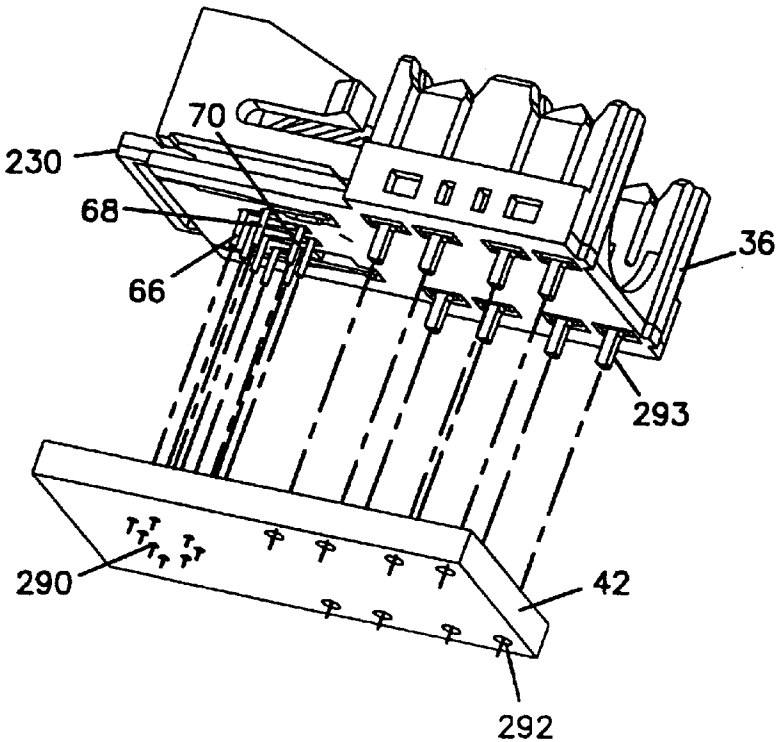
FIG. 17 is an exploded view showing the insert body and springs of FIGS. 14 and 15 positioned in alignment with a printed circuit board.

FIG. 17 shows the clip 230 fully inserted within the clip retaining structure 231 of the insert body 36. As so inserted, the retaining clip 230 retains all of the terminal posts 66, 68 and 70 in positioned locations that correspond to the locations of through-holes 290 defined by the printed circuit board 44. Similarly, insulation displacement connector contacts 293 are also positioned in alignment with through-holes 292 defined by the printed circuit board 44. Therefore, the printed circuit board can be readily connected to the insert body 36 by pressing the two pieces together such that the terminal posts 66, 68 and 70 fit within their corresponding through-holes 290 and the insulation displacement connectors fit within their corresponding through-holes 292. Preferably, a supplemental fixture is also used to maintain alignment of the posts 66, 68 and 70. In certain embodiments, the posts 66 and 68 (shown in FIGS. 10 and 11) can be fabricated so as to be angled slightly forward prior to insertion in the circuit board 42. Thus, when inserted in the through-holes 290, the posts 66 and 68 exert a spring bias to springs 60 and 62. FIG. 18 shows the insert body 36 and the printed circuit board 44 after the two pieces have been connected together.

With regard to the foregoing description, it is to be understood that changes may be made in detail without departing from the scope of the present invention. It is intended that the specification and depicted aspects of the invention may be considered exemplary, only, with a true scope and spirit of the invention being indicated by the board meaning of the following claims.

What is claimed is:

1. An electrical connector comprising:

a spring mounting body having a top side, a bottom side, and a first end positioned opposite from a second end, the spring mounting body including a clip receiving structure positioned at the bottom side of the spring mounting body;

a plurality of contact springs mounted on the spring mounting body, the contact springs including upper portions defining contact regions positioned above the top side of the spring mounting body, lower portions positioned under the spring mounting body, and bends interconnecting the upper side and lower portions, the bends being positioned to curve around the first end of the spring mounting body;

a clip inserted within the clip receiving structure for stabilizing the contact springs, the clip including a lip that abuts against the first end of the spring mounting body and covers an outer radius of the bends of the contact springs; and at least portions of the lower portions of the contact springs being captured between the clip and the bottom side of the spring mounting body.

2. An electrical connector comprising:

a spring mounting body having a top side, a bottom side, and a first end positioned opposite from a second end, the spring mounting body including a clip receiving structure positioned at the bottom side of the spring mounting body;

a plurality of contact springs mounted on the spring mounting body, the contact springs including upper portions defining contact regions positioned above the top side of the spring mounting body, and lower portions positioned under the spring mounting body;

a clip inserted within the clip receiving structure such that at least portions of the lower portions are captured between the clip and the bottom side of the spring mounting body for stabilizing the contact springs, the clip further including post retaining structures that engage and position the posts; and a circuit board positioned under the bottom side of the spring mounting body, wherein the springs include posts that project downwardly from the spring mounting body to provide electrical connectors with the circuit board.

3. The electrical connector of claim 2, wherein the post retaining structures are notched to receive the posts.

4. An electrical connector comprising:

a spring mounting body including a front end and a rear end, the spring mounting body also including a top side and a bottom side, the spring mounting body defining at least one through-slot that extends through the mounting body from the bottom side to the top side, the spring mounting body further including a clip receiving structure located at the bottom side of the spring mounting body;

a plurality of contact springs mounted on the spring mounting body;

the plurality of contact springs including a forwardly extending contact spring having a lower portion located below the spring mounting body and an upper portion that extends through the through-hole to provide a contact region located above the top side of the spring mounting body;

the plurality of contact springs including a rearwardly extending contact spring positioned next to the forwardly extending contact spring, the rearwardly extending contact spring including a lower portion connected to an upper portion by a bend, the bend being positioned to curve around the front end of the spring mounting body such that the upper portion of the rearwardly extending spring is located above the top side of the spring mounting body and the lower portion of the rearwardly extending spring is located below the spring mounting body; and a clip inserted within the clip receiving structure for stabilizing the contact springs, the lower portions of the contact springs being captured between the clip and the bottom side of the spring mounting body.

5. The electrical connector of claim 4, wherein the plurality of contact springs include six rearwardly extending springs and two forwardly extending springs, and wherein lower portions of all of the springs are captured between the clip and the bottom side of the spring mounting body.

6. The electrical connector of claim 4, further comprising a circuit board positioned under the bottom side of the spring mounting body, wherein the springs include posts that project downwardly from the spring mounting body to provide electrical connectors with the circuit board.

7. The electrical connector of claim 6, wherein the clip includes post retaining structures that engage and position the posts.

8. The electrical connector of claim 7, wherein the post retaining structures are notched to receive the posts.

9. The electrical connector of claim 4, wherein the clip is snap-fit within the clip receiving structure.

10. The electrical connector of claim 4, wherein the clip includes spring support structures corresponding to each of the springs.

11. The electrical connector of claim 10, wherein the spring support structures are contoured to complement contours of the springs.

12. The electrical connector of claim 10, wherein the spring support structures include support surfaces that press the springs against the bottom side of the spring mounting body.

13. The electrical connector of claim 12, wherein selected ones of the support surfaces have different elevations.

14. The electrical connector of claim 10, wherein the forwardly extending spring includes a bend, and wherein a corresponding one of the spring support structure has a rounded portion that corresponds to the bend of the forwardly extending spring.

15. The electrical connector of claim 4, wherein the clip includes a front lip that abuts against the front end of the spring mounting body and covers the bend of the rearwardly extending spring.

16. A method for mounting telecommunication contact springs, the method comprising:

providing a dielectric spring mounting body;

positioning the contact springs at desired locations on the spring mounting body, the contact springs including termination posts;

stabilizing the contact springs by capturing first portions of the contact springs between the spring mounting body and a dielectric clip;

stabilizing the termination posts by engaging the termination posts with post retainers of the clip; and connecting the clip to the spring mounting body with the captured first portions of the contact springs remaining captured and the termination posts remaining stabilized after the clip has been connected to the spring mounting body.

17. The method of claim 16, wherein the spring mounting body includes a top side and a bottom side, and wherein the clip is connected to the spring mounting body by inserting the clip into a clip receiving structure located at the bottom side of the spring mounting body.

18. The spring method of claim 16, further comprising connecting the springs to a printed circuit board having though-holes for receiving the posts, the through-holes being aligned with the predetermined positions of the posts.

19. A method for connecting contact springs to a circuit board, the method comprising:

providing a dielectric spring mounting body;

positioning the contact springs at desired locations on the spring mounting body, the contact springs including posts that project outwardly from the spring mounting body;

stabilizing the posts at predetermined locations corresponding to through-holes defined by the circuit board by engaging the posts with post retaining portions of a clip that is connected to the spring mounting body after the springs have been positioned at the desired locations; and after the clip has been connected to the spring mounting body, inserting the posts into the through-holes defined by the circuit board.

20. A method for mounting telecommunication contact springs, the method comprising:

providing a spring mounting body having a top side, a bottom side, and a front end opposite a rear end;

positioning the contact springs in a forwardly extending orientation such that a bend of the contact springs curves around the front end of the spring mounting body;

inserting a clip from the end of the spring mounting body toward the rear end of the spring mounting body; and stabilizing the contact springs by capturing portions of the contact springs between the spring mounting body and the clip.

21. The method of claim 20, wherein the step of inserting a clip includes inserting the clip along a direction from the bends of the contact springs towards posts of the contact springs.

*22. A jack assembly comprising:*

*a spring mounting body having a first side and a second side, the spring mounting body including a clip receiving structure;*

*a plurality of contact springs mounted within the spring mounting body, the contact springs including first portions and termination posts, wherein the termination posts are adjacent the second side of the spring mounting body; and*

*a clip having a plurality of spring retaining structures, the clip being inserted within the clip receiving structure for stabilizing the contact springs, wherein the first portions of the contact springs are captured between the clip and the spring mounting body, and wherein the clip and the spring mounting body also capture the contact springs adjacent the termination posts.*

*23. The jack assembly of claim 22, wherein the termination posts are captured by the clip adjacent to the second side of the spring mounting structure.*

*24. The jack assembly of claim 22, wherein the termination posts extend through the second side of the spring mounting body.*

*25. The jack assembly of claim 24, further including a circuit board, wherein the termination posts are connected to the circuit board.*

*26. The jack assembly of claim 22, wherein the clip contacts the first portion of the contact springs.*

*27. A jack assembly comprising:*

*a spring mounting body having a first side and a second side;*

*a plurality of contact springs mounted within the spring mounting body, the contact springs including first portions and second portions, wherein the second portions are adjacent the second side of the spring mounting body; and*

*a clip inserted within the spring mounting body for stabilizing the mounted contact springs, the clip including a plurality of retaining structures that retain the plurality of contact springs, wherein the first and second portions of the contact springs are positioned between the clip and the spring mounting body.*

*28. The jack assembly of claim 27, wherein the second portions of the contact springs include termination posts that project outward from the second side of the mounting body.*

*29. The jack assembly of claim 28, wherein the clip includes post retaining structures that engage the second portions to stabilize the contact springs.*

*30. The jack assembly of claim 29, wherein the post retaining structures are notched to receive the second portions.*

*31. The jack assembly of claim 29, further comprising a circuit board positioned under the second side of the spring mounting body, wherein the termination posts engage the circuit board to provide electrical connections with the circuit board.*

*32. A jack assembly comprising:*

*a spring mounting body including a clip receiving structure;*

*a plurality of contact springs mounted at the spring mounting body, the contact springs including termination posts; and*

*a clip inserted within the clip receiving structure, the contact springs being captured between the clip and the spring mounting body, the clip including a plurality of spaced-apart retainers that engage the contact springs adjacent the termination posts, the plurality of spaced-apart retainers including at least one separate retainer corresponding to each of the contact springs;*

*wherein the spring mounting body includes a plurality of slots, and wherein at least some of the retainers fit within the slots;*

*wherein the retainers are spaced apart from one another along a first dimension, and wherein at least some of the retainers are also offset from one another along a second dimension, the second dimension being perpendicular to the first dimension.*

*33. The jack assembly of claim 32, wherein the plurality of contact springs includes 8 contact springs, and wherein the plurality of spaced-apart retainers includes at least separate 8 retainers.*

*34. The jack assembly of claim 32, further comprising a circuit board, wherein the termination posts of the contact springs are terminated to the circuit board.*

*35. The jack assembly of claim 32, wherein the clip is secured to the spring mounting body by a snap-fit connection.*

*36. The jack assembly of claim 32, wherein the spaced-apart retainers of the clip include notches that receive the terminations posts.*

*37. A jack assembly comprising:*

*a spring mounting body including a clip receiving structure;*

*a plurality of contact springs mounted at the spring mounting body, the contact springs including termination posts; and*

*a clip inserted within the clip receiving structure, the contact springs being captured between the clip and the spring mounting body, the clip including a plurality of spaced-apart retainers that engage the contact springs adjacent the termination posts, the plurality of spaced-apart retainers including at least one separate retainer corresponding to each of the contact springs;*

*wherein the retainers are spaced apart from one another along a first dimension, and wherein at least some of the retainers are also offset from one another along a second dimension, the second dimension being perpendicular to the first dimension.*

* * * * *